(12) United States Patent
North et al.

(10) Patent No.: US 12,743,739 B2
(45) Date of Patent: Sep. 22, 2026

(54) SYSTEM AND METHOD FOR BALANCING CONTAINERIZED APPLICATION OFFLOADING AND BURST TRANSMISSION FOR THERMAL CONTROL

(71) Applicant: Dell Products, LP, Round Rock, TX (US)

(72) Inventors: Travis C. North, Cedar Park, TX (US); Qinghong He, Austin, TX (US); Suresh K. Ramasamy, Cedar Park, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 747 days.

(21) Appl. No.: 17/579,365

(22) Filed: Jan. 19, 2022

(65) Prior Publication Data

US 2023/0230194 A1 Jul. 20, 2023

(51) Int. Cl.
*G06T 1/20* (2006.01)
*G06F 1/20* (2006.01)
(Continued)

(52) U.S. Cl.
CPC ................ *G06T 1/20* (2013.01); *G06F 1/206* (2013.01); *G06F 1/26* (2013.01); *G06F 9/4893* (2013.01);
(Continued)

(58) Field of Classification Search
CPC ... G06T 1/20; G06F 1/206; G06F 1/26; G06F 9/4893; G06F 2209/5019;
(Continued)

(56) References Cited

U.S. PATENT DOCUMENTS 5,230,564 A * 7/1993 Bartilson .............. H01L 23/467 257/467
6,891,726 B1 5/2005 Montoya
(Continued)

FOREIGN PATENT DOCUMENTS

CA 2384621 A1 3/2001
CN 2930133 Y * 8/2007

OTHER PUBLICATIONS

Divakar MP, "Surface Temperatures of Electronics Products: Appliances vs. Wearables", 2016, Electronics Cooling, pp. 1-8, https://www.electronics-cooling.com/2016/09/surface-temperatures-of-electronics-products-appliances-vs-wearables/ (Year: 2016).*
(Continued)

*Primary Examiner* — Alexey Shmatov
*Assistant Examiner* — Kyu Hyung Han
(74) *Attorney, Agent, or Firm* — Prol Intellectual Property Law, PLLC; H. Kenneth Prol

(57) ABSTRACT

An information handling system executing a containerized application and burst transmission thermal balance system may comprise a processor executing containerized software applications, the processor executing code instructions to determine a skin surface temperature of a portion of the chassis is approaching a preset limit, based on a temperature measured by one of a plurality of temperature sensors in the information handling system chassis at a first location, determine whether the first location is closer to the antenna or the processor to determine a causal heat source in the information handling system, and a load balancing driver to offload the execution of the containerized software applications to an edge computing resource via an antenna, when the processor is determined as the causal heat source.

20 Claims, 4 Drawing Sheets

(51) Int. Cl.
*G06F 1/26* (2006.01)
*G06F 9/48* (2006.01)

(52) U.S. Cl.
CPC ................ *G06F 2209/5019* (2013.01); *G06F 2209/5022* (2013.01); *G06F 2209/506* (2013.01); *G06F 2209/508* (2013.01); *G06F 2209/509* (2013.01)

(58) Field of Classification Search
CPC ....... G06F 2209/5022; G06F 2209/506; G06F 2209/508; G06F 2209/509; G06F 1/203; G06F 9/5094; Y02D 10/00
See application file for complete search history.

(56) References Cited

U.S. PATENT DOCUMENTS 9,293,802 B2 3/2016 Voss
9,557,786 B2 1/2017 Wang
11,792,709 B2 * 10/2023 Park
2006/0221568 A1 10/2006 Kardach
2010/0217454 A1 * 8/2010 Spiers ................ H05K 7/20836 713/320
2011/0301777 A1 12/2011 Cox
2011/0301778 A1 12/2011 Liang
2013/0258582 A1 10/2013 Shelnutt
2013/0332720 A1 * 12/2013 Gupta
2014/0298349 A1 * 10/2014 Jackson ................ G06F 1/3206 718/104
2015/0075186 A1 3/2015 Prajapati
2016/0268694 A1 9/2016 Ma
2016/0274629 A1 9/2016 Lovicott
2016/0371218 A1 * 12/2016 Roberts-Hoffman ........................ G06F 13/4282
2017/0323212 A1 * 11/2017 Volkov .................. G06N 3/006
2021/0099329 A1 * 4/2021 Hellfajer
2021/0181820 A1 * 6/2021 Shenoy .................. G01K 7/425
2021/0397999 A1 * 12/2021 Bernat ................ G06F 11/3442
2024/0036631 A1 * 2/2024 Ma ........................ G06F 1/3296

OTHER PUBLICATIONS

Menon et al. "Thermal aware automated load balancing for hpc applications." IEEE International Conference on Cluster Computing (Cluster), 8 pages, Sep. 2013. https://ieeexplore.ieee.org/abstract/document/6702627.

* cited by examiner

SYSTEM AND METHOD FOR BALANCING CONTAINERIZED APPLICATION OFFLOADING AND BURST TRANSMISSION FOR THERMAL CONTROL

FIELD OF THE DISCLOSURE

The present disclosure generally relates to wireless communication performance for computing devices. More specifically, the present disclosure relates to a system for balancing thermal control by the offloading of processing for containerized applications with heat generated during burst transmissions required for such offloading relative to local compute to ensure information handling system chassis surfaces coming into contact with a user's skin stay at or below a preset comfort threshold.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
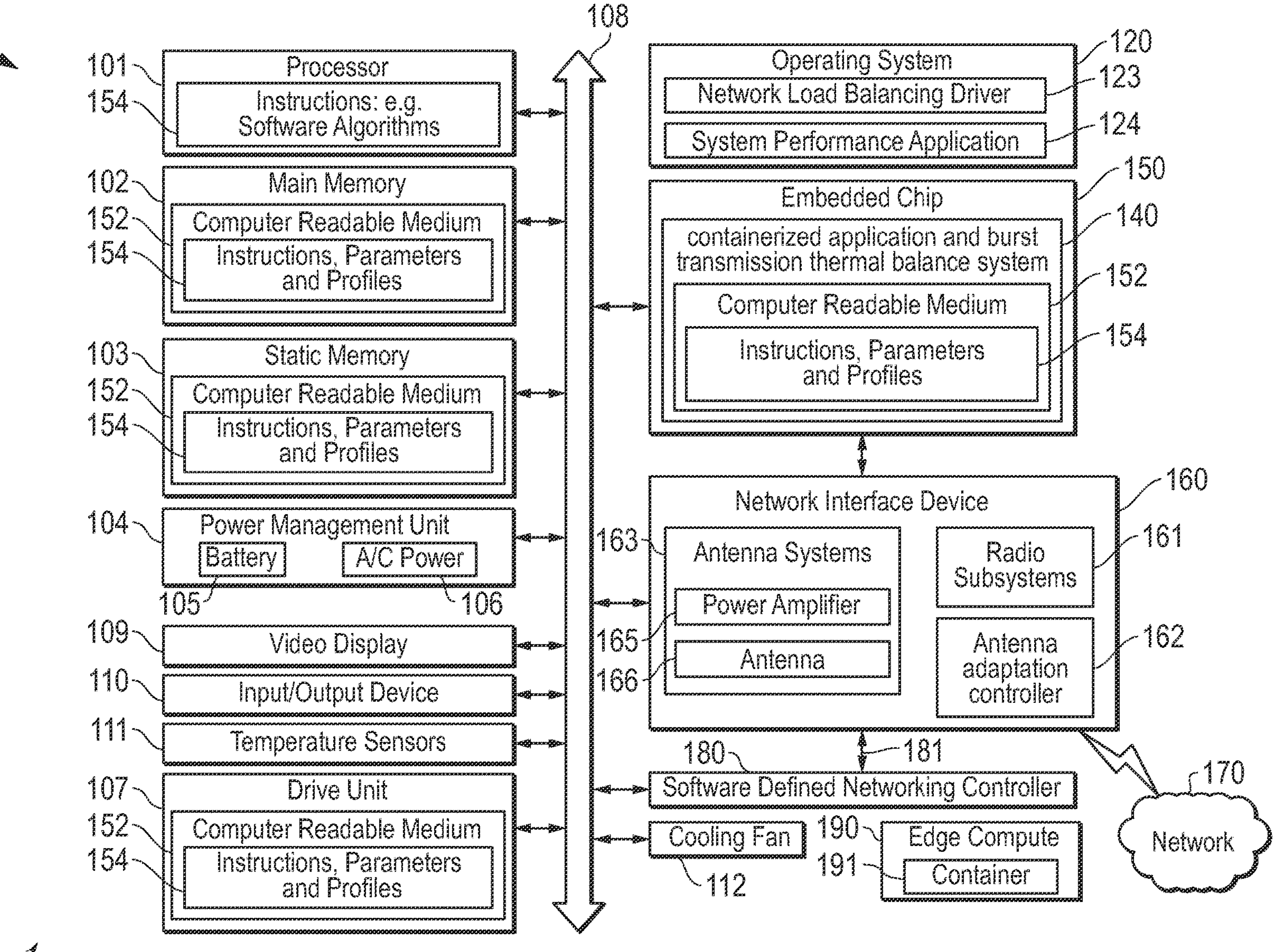
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Mobile devices frequently coming into contact with a user's skin (e.g., hands, laps, etc.) may employ a variety of thermal control mechanisms designed to ensure the portions of the exterior surface or "skin surface" of such devices that frequently contact a user's skin stay at or below a maximum limit chassis skin surface temperature that most users find comfortable. The components housed within a chassis of such an information handling system in various embodiments described herein that are most likely to generate heat affecting the skin surface temperature include various processors (e.g., central processing unit (CPU), graphics processing unit (GPU), a Visual Processing Unit (VPU), or a hardware accelerator), power systems or battery, and antennas and radio subsystems used in wireless communication with networks connected to the internet. In particular, antennas and radio subsystems operating under the 5G standard with high data bandwidth may consume up to 1 Watt of power and generate heat during operation.

Existing systems employ structures such as fans, heat sinks, cooling strips, and various thermal control methods primarily pointed at capping or down-throttling power supplied to these heat-producing components (e.g., processors and antennas). However, the new cellular 5G standard toward which communications for many mobile computing devices has shifted to transmission of data in short bursts that markedly increase the power drawn by antennas over a short time period. These data bursts allow for offloading of computing tasks previously performed on the mobile device to edge or cloud-based computing resources, lessening the burden placed on the mobile device processors, and thus heat generated by the same. In order to capture these benefits of the new 5G standards, including greater data transmission speed, mobile computing device antennas may perform such burst transmissions routinely under the 5G protocols. Thermal control methods intended to keep skin temperatures of portions of an information handling system chassis at or near the 5G antennas or radios at or below a maximum limit chassis skin surface temperature (e.g., limit for a user's comfort level) may involve passive or active thermal control methods. Further, temperature control systems may further involve throttling of power delivered to the antenna during such bursts, or limiting frequencies of such bursts, but this may impact data transmission performance. A solution that maintains the mobile computing device skin temperature at or below a maximum limit chassis skin surface temperature (e.g., limit for user comfort levels) and allows for such burst transmissions or provides for alternative local compute to maintain processing levels for applications operating on the information handling system is needed.

A containerized application and burst transmission thermal balance system in embodiments of the present disclosure address these issues by tailoring the processing location as well as the thermal control method employed at a given time to address a specific source of heat energy causing an increase in the skin surface temperature of the chassis. One or more processors of the mobile device may be the primary source of increased skin surface temperature when the processors (e.g., central processing unit or graphics processing unit) are executing processor-intensive software applications such as video conferencing applications or gaming applications. One solution to such a high processor burden at the mobile device in embodiments described herein may include offloading execution of some of these applications to edge computing resources in communication with the mobile device via a wireless network. However, in order to offload such applications and maintain quality performance of those applications as experienced by the mobile device user, large amounts of data must be transceived via one or more antennas. These large data burst transmissions via the antennas may require increased power supply to those antennas, which may also generate thermal energy that causes the skin surface temperature to increase. Thus, there is a need to balance between these two approaches, depending on which components (e.g., processors or antennas) are currently driving increased temperatures of the chassis skin surface.

The containerized application and burst transmission thermal balance system in embodiments described herein may measure chassis skin surface temperature via a plurality of temperature sensors located in various positions within the mobile device. Such temperature measurements may be used to determine whether the antennas or the processors of the mobile device located at different areas of the chassis skin or outer surface are driving increased temperatures of the chassis skin surface temperature in various embodiments described herein. If one or more processors are driving increased temperatures of the chassis skin surface temperature and reach a control point approaching a maximum limit chassis skin surface temperature in embodiments, the containerized application and burst transmission thermal balance system may offload processing tasks to edge computing resources, which may decrease the processing burden on internal processors and lower thermal energy output by the processors. If one or more antennas are driving increased temperatures of the chassis skin surface temperature and reach a control point approaching a maximum limit chassis skin surface temperature, the containerized application and burst transmission thermal balance system in another embodiment may either cease offloading of processing tasks to edge computing resources, diverting those tasks to the local processors, and decreasing power supplied to the antennas and thermal energy output by those antennas. In such a way, the containerized application and burst transmission thermal balance system in embodiments in which processor-intensive applications are being executed at the mobile device may inhibit thermal control schemes from being initiated that involve throttling of processing capabilities and that may cause a drop in application performance.

FIG. 1 illustrates an information handling system 100 according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile computing device, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

In an embodiment, the information handling system may include an embedded chip 150 that may be any device or devices that execute instructions, parameters, and profiles 154 of a containerized application and burst transmission thermal balance system 140 to tailor processing shifts and thermal control methods employed to maintain temperatures along the chassis enclosing the information handling system at or below a maximum limit chassis skin surface temperature (e.g., limit for user comfort levels) to address a specific internal component (e.g., antenna 166 or processor 101) causing the increase in the skin surface temperature of the chassis. The information handling system 100 may include a memory 102, (with computer readable medium 152 that is volatile (e.g. random-access memory, etc.), nonvolatile memory (read-only memory, flash memory etc.) or any combination thereof), one or more processing resources, such as a central processing unit (CPU), a graphics processing unit (GPU), a Visual Processing Unit (VPU) or a Hardware Accelerator, any one of which may be the processor 101 illustrated in FIG. 1, hardware or software control logic, or any combination thereof. Additional components of the information handling system 100 may include one or more storage devices 103 or 107, a network interface device 160, one or more communications ports for communicating with external devices, as well as, various input and output (I/O) devices 110, such as a keyboard, a mouse, or any combination thereof. A power management unit 104 supplying power to the information handling system 100, via a battery 105 or an alternating current (A/C) power adapter 106 may supply power to one or more components of the information handling system 100, including the processor 101, the network interface device 160, and the temperature sensors 111.

The information handling system 100 may include one or more types of temperature sensors 111 (e.g., thermocouples, resistance temperature detectors, thermistors, optical thermal sensors, temperature diodes, or semiconductor based integrated circuits), which may be strategically located nearby or between various components of the information handling system 100 and the chassis enclosing it. In one example embodiment, one or more temperature sensor diodes 111 may be operably connected to a motherboard and may be situated nearby the network interface device 160 (e.g., 5G WWAN antenna 166 or radio of the interface device), the CPU (e.g., 101), a Graphics Processing Unit (GPU), a Visual Processing Unit (VPU), or a hardware accelerator. In another example embodiment, such temperature diodes 111 may be operably connected to a flywire extending to the interior surface of a chassis skin enclosing the information handling system 100 to allow such a temperature diode 111 to measure a temperature at an interior portion of the chassis skin as well.

In still other embodiments, a temperature sensor 111 may be located at or near a portion of the antenna 166 in order to measure an operating temperature of the antenna 166. As yet another example embodiment, a temperature sensor 111 may be located between the chassis skin surface and the antenna 166 to measure the effect of the operation of the antenna (e.g., 166) on the surface or skin temperature of the outer layer of the chassis enclosing the information handling system 100. As yet another example embodiment, a temperature sensor 111 may be located between the chassis skin surface and the processor 101 to measure the effect of the processor operation on the surface or skin temperature of the outer layer of the chassis enclosing the information handling system 100. In still another example, a temperature sensor 111 may be located just beneath or incorporated within the chassis enclosing the information handling system 100 in order to directly measure the temperature on the surface or skin temperature of the outer layer of the chassis enclosing the information handling system 100 at various locations and for either processors or antennas.

The information handling system 100 may further include video display 109. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 154 that may operate on servers or systems, remote data centers, or on-box in individual client information handling systems 100 according to various embodiments herein. In some embodiments, it is understood any or all portions of code instructions 154 may operate on a plurality of information handling systems 100.

The information handling system 100 may include a processor 101 such as a central processing unit (CPU), a GPU, a Visual Processing Unit (VPU), or a hardware accelerator, embedded controllers (e.g., 150) or control logic or some combination of the same. Any of the processing resources may operate to execute code that is either firmware or software code. Moreover, the information handling system 100 may include memory such as main memory 102, static memory 103, containing computer readable medium 152 storing instructions 154. Instructions 154 may include a containerized application and burst transmission thermal balance system 140, operating system (OS) software 120, application software, BIOS software, or other software applications or drivers (e.g., 123) detectable by processor type 101.

The OS 120 in an embodiment may be capable of executing a plurality of software applications, including, for example, a load balancing driver 123. The load balancing driver 123 in an embodiment may track bandwidth of all software applications executing under the OS 120, pursuant to which data is transferred via a wireless link to the network 170. In such a way, the load balancing driver 123 may provide information the containerized application and burst transmission thermal balance system 140 to use to determine what percentage of packets being transceived via one or more network interface devices (e.g., 160) are attributable to execution of each software application executing at the OS 120. Additionally, the load balancing driver 123 in an embodiment may operate to balance the transceiving of data packets pursuant to execution of software applications by the OS 120 across a plurality of network interface devices (e.g., 160), and to determine processing utilization of local compute for various software applications. The load balancing driver 123 in an embodiment may group various software applications executing via the OS 120, pursuant to which data is being transceived via the network interface device 160 into a plurality of containers, according to the Quality of Service (QoS) requirements for each application. QoS requirements in an embodiment may be set within the code instructions of applications, or may be adjustable by a user. For example, certain latency-sensitive applications, such as videoconferencing applications like Zoom® or Microsoft® Teams® may be grouped together into a high QoS container, because those applications often require lower latency, and thus higher QoS wireless links in order to perform optimally. In another example, software applications that have offloaded some or all processing tasks to remote edge computing resources within network 170 may also be grouped into such a high QoS container, because such offloading requires rapid and frequent transceiving of data in order to perform remote processing tasks. In yet another example, software applications less sensitive to latency or requiring lower throughput values in order to operate effectively, such as Google® Chrome® may be grouped into lower QoS containers. In other words, software applications may be placed within a high, medium, or low QoS container, in an embodiment, based upon a minimum throughput value requirement or a maximum latency value requirement associated with the software application. Any number of QoS container categories is contemplated in various embodiments.

The disk drive unit 107 and static memory 103 may also contain space for data storage in a computer readable medium 152. The instructions 154 in an embodiment may reside completely, or at least partially, within the main memory 102, the static memory 103, and/or within the disk drive 107 during execution by the processor 101. The information handling system 100 may also include one or more buses 108 operable to transmit communications between the various hardware components such as any combination of various input and output (I/O) devices, display 109, or the network interface device 160, or the like.

The containerized application and burst transmission thermal balance system 140 in an embodiment may operate to tailor the processing as well as the thermal control method employed at a given time to address a specific source of heat energy (e.g., processor 101 or network interface device 160) causing an increase in the skin surface temperature of the chassis. One or more processors (e.g., 101) may be the primary source of increased skin surface temperature when the processors (e.g., 101, a graphics processing unit (GPU), a Visual Processing Unit (VPU), or a hardware accelerator) are executing processor-intensive, high QoS software applications such as video conferencing applications or gaming applications. One solution to such a high processor burden in an embodiment may include offloading execution of some of these applications within a software application container 191 to edge computing resources 190 in communication with the information handling system 100 via a wireless network 170. However, in order to offload such a container 191 and maintain quality performance of applications executing with that container 191, as experienced by the information handling system 100 user, large amounts of data must be transceived via one or more antennas (e.g., 166). These large data transmissions may utilize a large amount of data bandwidth via the antennas (e.g., 166) which may require increased power supplied to those antennas (e.g., 166) by a power management unit 104, for example as with 5G antenna systems or WiFi 6 or WiFi 6E wireless data transmission. This increased power for high bandwidth antenna operation may also generate thermal energy that causes the skin surface temperature of the chassis for the information handling system 100 to increase. Thus, embodiments of the present disclosure balance between these two approaches, depending on which components (e.g., processor 101 or antenna 166) are currently driving increased temperatures of the chassis skin surface.

The containerized application and burst transmission thermal balance system 140 in an embodiment may use chassis skin surface temperatures measured via a plurality of temperature sensors (e.g., 111) located in various positions within the information handling system 100 to determine whether the antenna (e.g., 166) or the processor (e.g. 101), (or various other components) of the information handling system 100 located at different areas of the chassis skin or outer surface are driving increased temperatures of the chassis skin surface temperature. If one or more processors (e.g., 101, GPU, a Visual Processing Unit (VPU), or a hardware accelerator) are driving increased temperatures of the chassis skin surface temperature in an embodiment, the containerized application and burst transmission thermal balance system 140 may offload processing tasks for container 191 to edge computing resources 190, which may decrease the processing burden on internal processors (e.g., 101) and lower thermal energy output by the processors (e.g., 101). If one or more antennas (e.g., 166) are driving increased temperatures of the chassis skin surface temperature, the containerized application and burst transmission thermal balance system 140 in an embodiment may cease offloading of processing tasks for container 191 to edge computing resources 190, diverting those tasks to the local processors (e.g., 101, GPU, a Visual Processing Unit (VPU), or a hardware accelerator), and decreasing power supplied to the antennas (e.g., 166) and thermal energy output by those antennas (e.g., 166). In such a way, the containerized application and burst transmission thermal balance system 140 in an embodiment in which processor-intensive applications are being executed locally at the information handling system 100 (e.g., via processor 101) may inhibit or delay thermal control schemes being initiated that involve throttling of processing capabilities or data bandwidth of antenna transmissions and that may cause a drop in application performance.

Information handling system 100 in an embodiment may comprise a mobile computing device, such as a laptop or tablet computer, as described in greater detail herein, or may, in some embodiments, comprise a docking station for such a mobile computing device. The information handling system 100 in such an embodiment may operate on wired and wireless links to connect with the network 170 via a network Access Point (AP), as described in greater detail herein.

The network interface device 160 may provide connectivity of the information handling system 100 to the network 170 via a network AP in an embodiment. The network 170 in some embodiments may be a wired local area network (LAN), a wireless personal area network (WPAN), a wireless Local Area Network (WLAN), such as a public WiFi communication network, a private WiFi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols or Bluetooth® protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Communications within NRFR1 may be enabled through the use of either an eNodeB executing an evolved packet core of an existing LTE system, or a Next Generation Node B (gNodeB) executing the next generation packet core of the 5G cellular standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In an embodiment, the network interface device 160 may be communicatively coupled to one or more antenna systems 163 used to provide one or more separate communication channels to the network 170. Such communications channels may be found in any communication network described herein. The antennas 163 may support Wi-Fi 6, Wi-Fi 6e, or a 5G wireless communication protocol so that relatively higher amounts of data may be transceived by the information handling system 100 to any communication network to which the information handling system 100 is communicatively coupled in some embodiments.

The antenna systems 163 in an embodiment may include a power amplifier 165, and various antennas 166. As described herein, the 5G communication standard may allow for or require transceiving of data packets through the network interface device 160 in bursts that draw higher power from the PMU 104 than non-burst transmissions, though either may contribute to heat generation according to embodiments herein. The amplifier 165 in an embodiment may facilitate such higher power draws to the antenna 166. As the power drawn by the antenna 166 increase in such a way, the temperature of antenna 166 and portions of the chassis directly surrounding antenna 166 may similarly increase. Such burst transmissions, high bandwidth continuous transmissions, or high data rate continuous transmissions may be needed, in an example embodiment, when the processing of one or more software applications executed via the OS 120 has been offloaded to edge-computing resources within network 170 with which the information handling system 100 communicates via the network interface device 160. Thermal control methods intended to keep skin temperatures of the chassis at or below a maximum limit chassis skin surface temperature (e.g., limit for user's comfort level) may involve throttling of power delivered from the power management unit 104 to the antennas (e.g., 166) during such bursts. Shifting of processing tasks from these edge-compute or remote resources within network 170 to the local processor (e.g., 101) may delay or avoid implementation of these thermal control measures according to some embodiments herein. However, as the volume of processing tasks assigned to the local processor 101 increase, so too does the heat emitted by that processor 101, and the temperature of the portions of the chassis situated nearby the processor 101. Temperatures at these locations (e.g., nearby the processor 101) may be decreased in an embodiment by throttling power to the local processors and offloading processing tasks to the edge computing resources in the network 170. Thus, the containerized application and burst transmission thermal balance system 140 in an embodiment may operate to balance these competing needs by throttling power to the specific component (e.g., antenna 166 or processor 101) that is currently determined to be driving the increased temperature at one or more points along the chassis skin surface.

The antenna adaptation controller 162 may execute instructions as disclosed herein for monitoring wireless link state information, wireless link configuration data, network slice data, channel selection, antenna radiation patterns, or other antenna data. For example, the antenna adaptation controller 162 in an embodiment may gather beacon data received from one or more nearby access points (APs) for the network 170 describing channels available for communication with that AP, as well as various current traffic metrics for communications on those channels. More specifically, such beacon information may provide a relative signal strength indicator (RSSI), identification of the network 170 as private or public, identification of the network 170 as compatible with multiple user, multiple input, multiple output (MU-MIMO) communications, high available data rate, levels of channel contention, and current load of communications at the AP. Such beacon data may include such measurements or indications for each of the channels within which the AP is capable of transceiving data, and the beacons may be received in regular intervals. Such received beacon data may be stored in an embodiment at the main memory 102, or in temporary BIOS memory accessible in kernel mode. Instructions or a controller may execute software or firmware applications or algorithms which utilize one or more wireless links for wireless communications via the network interface device 160 and the plurality of antenna systems 163 for the plurality of supported wireless protocols as well as other aspects or components. Antenna adaptation controller 162 may also control selection from among an available plurality of antennas 166 via antenna switching or adjust antenna matching or antenna directionality in some cases for antenna systems 163, tune multi-frequency antennas for different bands, or adjust antenna directionality such as via phase shifting, use of parasitic elements or other similar techniques.

The network interface device 160 in an embodiment may further include a radio subsystem 161 which may operate to modulate and demodulate signals transceived within a WWAN or WLAN format, set signal transmission power levels, along with power amplifier 165, or sensitivity to signal reception, select channels or frequency bands, and conduct other functions in support of a wireless transmission from the information handling system 100 to the communication network 170.

The SDN controller 180 in an embodiment may operate, in part, to route data incoming from or outgoing to a specifically identified software application executing at the OS 120 such that the data is only transceived within a radio frequency sub-portion or network slice assigned to that specifically identified software application by the load balancing driver 123. For example, the SDN controller 180 may be capable of routing packets transceived pursuant to execution of software applications grouped by the load balancing driver 123 into a high QoS container, a medium QoS container, or a low QoS container through a specific network interface device (e.g., 160), or through a specific antenna (e.g., 166). As described herein, the number of containers and division of applications into containers may take many forms, including grouping according to QoS, grouping according to CPU usage (either local CPU 101 or edge processing resources 190), or grouping according to various other factors.

The network interface device 160 may be communicatively coupled to the SDN controller 180 via bus 108 or via a separate communication line 181. The communication line 181 and bus 108 in an embodiment may support one or more protocols for routing packets/frames between or among network interface devices via an SDN controller 180, such as, for example, the OpenFlow® protocol, or the Interface to the Routing System (i2rs) protocol. It is contemplated that communication line 181 or bus 108 may support any other currently known or later developed protocols for control of a network interface device by an SDN controller 180. The SDN controller 180 in an embodiment may include, for example, an OpenDaylight® controller, a Nicira® Networks/VMWare® NOX™ controller, an NTT®/Google® ONIX® controller, the NEC® Trema® controller, the NTT® Ryu® controller, or open-sourced controllers such as PDX or Beacon controllers. In some embodiments, the SDN controller 180 may comprise a software-defined wide-area network (SD-WAN) controller operating to unify networking connections covering a wide geographical area within an enterprise.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 154 or receives and executes instructions, parameters, and profiles 154 responsive to a propagated signal, so that a device connected to a network 170 may communicate voice, video or data over the network 170. Further, the instructions 154 may be transmitted or received over the network 170 via the network interface device 160. The information handling system 100 may include a set of instructions 154 that may be executed to cause the computer system to perform any one or more of the methods or computer-based functions disclosed herein. For example, instructions 154 may include a particular example of a containerized application and burst transmission thermal balance system 140, or other aspects or components. Various software modules comprising application instructions 154 may be coordinated by an operating system (OS), and/or via an application programming interface (API). An example operating system may include Windows®, Android®, and other OS types. Example APIs may include Win 32, Core Java API, or Android APIs. Application instructions 154 may also include any application processing drivers, or the like executing on information handling system 100.

The containerized application and burst transmission thermal balance system 140 may utilize a computer-readable medium 152 in which one or more sets of instructions 154 such as software may be embedded. The instructions 154 may embody one or more of the methods or logic as described herein. For example, instructions relating to the containerized application and burst transmission thermal balance system 140, software algorithms, processes, and/or methods may be stored here.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 154 of the containerized application and burst transmission thermal balance system 140 may be stored in static memory 103, or the drive unit 107 on a computer-readable medium 152 such as a flash memory or magnetic disk in an example embodiment. While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
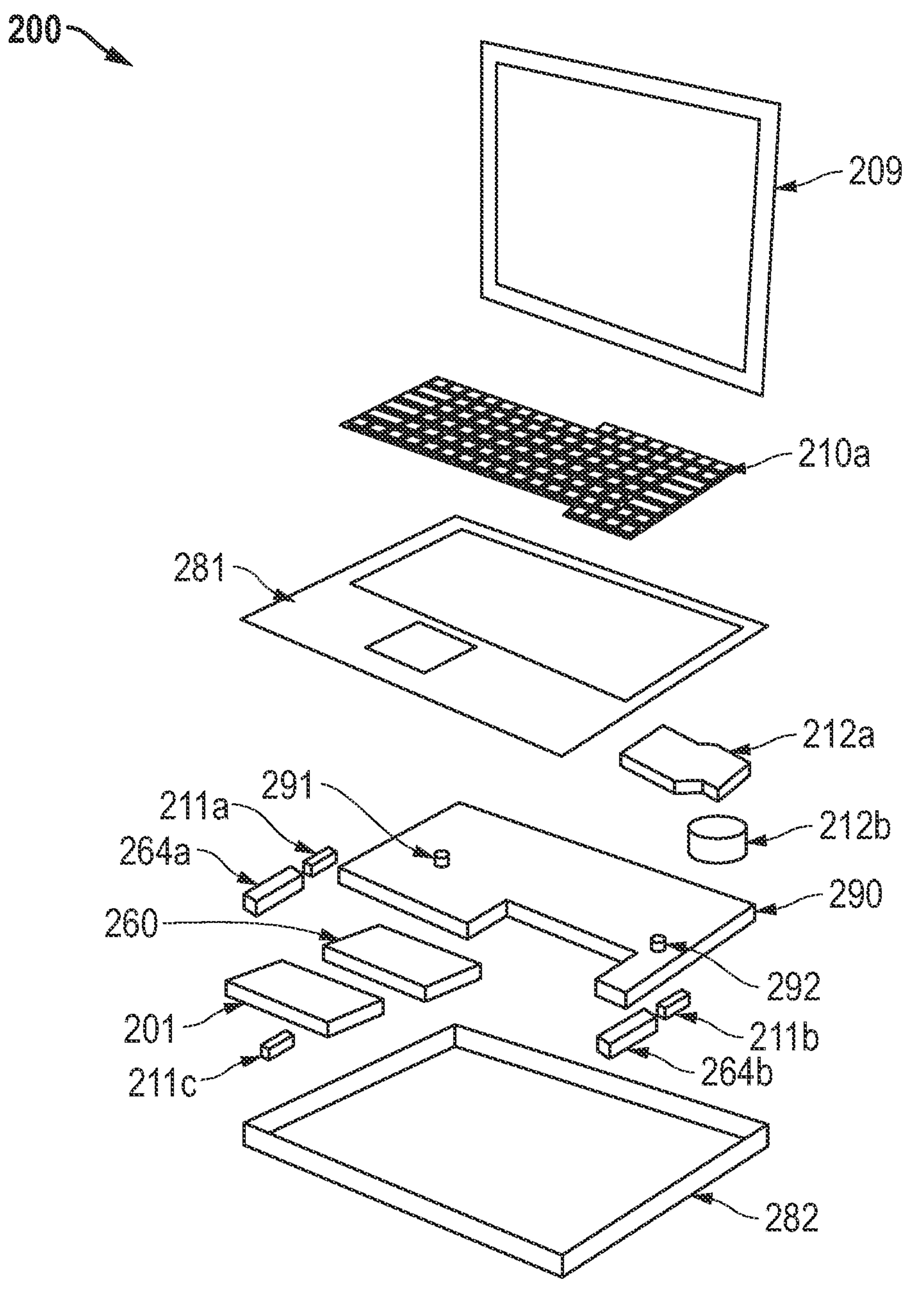
FIG. 2 is a graphical diagram illustrating an exploded view of components housed within a chassis rated for a maximum skin surface temperature according to an embodiment of the present disclosure.

FIG. 2 is a graphical diagram illustrating an exploded view of components of an information handling system 200 housed within a chassis rated for a maximum skin surface temperature according to an embodiment of the present disclosure. An information handling system 200 in an embodiment may comprise a video display 209, a keyboard 210*a*, a motherboard 290, a Central Processing Unit (CPU) 201, a conventional or thermal control system 212*a*, a fan 212*b*, one or more antennas (e.g., 264*a* and 264*b*) and one or more temperature sensors (e.g., 211*a*, 211*b*, or 211*c*). As described herein, in one example embodiment, one or more temperature sensor diodes may also be operably connected to the motherboard 290 and may be situated nearby the network interface device (e.g., 5G WWAN or WiFi 6 or 6E antennas or radio of the network interface device), the CPU (e.g., 201), a Graphics Processing Unit (GPU), a Visual Processing Unit (VPU), or a hardware accelerator. In another example embodiment, one or more temperature sensor diodes may be operably connected to the network interface device 260 and situated nearby an antenna (e.g., 264*a*). In still another example embodiment, such temperature diodes may be operably connected to a flywire extending to the interior surface of a chassis (e.g., 281 or 282) enclosing the information handling system 200 to allow such a temperature diode to measure a temperature at an interior portion of the chassis (e.g., 281 or 282).

A chassis comprising a bottom portion 282 and a palm rest portion 281 may enclose several components of the information handling system, including the antennas 264*a* and 264*b*. Such a chassis for example may be rated to have a max skin temperature at 45 degrees Celsius to avoid harm or discomfort to a user who may come into contact with an external part of the chassis of information handling system 200. Various components not pictured here but described in greater detail with respect to FIG. 1 may also be enclosed within such a chassis.

As described herein, an information handling system 200 frequently coming into contact with a user's skin (e.g., hands, laps, etc.) may employ a variety of thermal control mechanisms designed to ensure the portions of the exterior surface or "skin surface" of such devices that frequently contact a user's skin stay at or below a maximum limit chassis skin surface temperature (e.g., temperatures most users find comfortable). The components housed within a chassis (e.g., including portions 281 and 282) of such an information handling system in various embodiments described herein that are most likely to generate heat affecting the skin surface temperature include various processors (e.g., CPU 201, graphics processing unit (GPU), a Visual Processing Unit (VPU), or a hardware accelerator), and antennas (e.g., 264*a* and 264*b*) used in wireless communication with networks connected to the internet.

Thermal control systems 212*a* employ structures such as fans (e.g., 212*b*), heat sinks, cooling strips, and various thermal control methods primarily pointed at capping or down-throttling power supplied to these heat-producing components (e.g., 201, 264*a*, or 264*b*) or throttling or suspending operation of heat producing components. However, the new cellular 5G standard toward which communications for many mobile computing devices has shifted may utilize transmission of data in short bursts that markedly increase the power drawn by antennas (e.g., 264*a* or 264*b*) over a short time period. In order to capture the benefits of same of the new 5G standard capabilities, including greater data transmission speed, mobile computing device antennas (e.g., 264*a* or 264*b*) may perform such burst transmissions routinely. Thermal control methods (e.g., as controlled by 212*a*) intended to keep skin temperatures at or below a maximum limit chassis skin surface temperature (limit for user's comfort level) may involve throttling of power delivered to the antenna (e.g., 264*a* or 264*b*) during such bursts, and inhibiting such bursts to occur or complete.

The containerized application and burst transmission thermal balance system executed by the CPU 201 or an embedded controller in an embodiment may address these issues by delaying default thermal control mechanisms (e.g., as controlled by 212*a*) involving throttling of power delivered to the antenna (e.g., 264*a* or 264*b*) or throttling or suspending operation of heat producing components. The containerized application and burst transmission thermal balance system in an embodiment may receive temperature measurements from a thermal sensor (e.g., 291 or 292) located along the motherboard 290, nearby an antenna (e.g., 264*a* or 264*b*, respectively) or the processor 201. The temperature measured at one or more of these sensors (e.g., 291 or 292) may be measured as meeting a control point (e.g., 35 degrees Celsius) for triggering the containerized application and burst transmission thermal balance system. In such an embodiment, the power drawn by the heat-producing component (e.g., antennas 264*a* or 264*b*, or processor 201) nearest the sensor measuring the control point temperature and the processing resources or the data bandwidth utilized pursuant to execution of software applications assigned to one or more containers may be determined by the containerized application and burst transmission thermal balance system. The containerized application and burst transmission thermal balance system in an embodiment may use such gathered information to identify which of the heat-producing components (e.g., processor or antenna) is driving the skin temperature meeting or exceeding the control point value that approaches a maximum chassis skin temperature limit within a threshold percentage or a threshold temperature amount, and orchestrate offloading of applications to edge computing resources or shifting of currently offloaded applications to local processors, as described in greater detail below.

Figure 3:
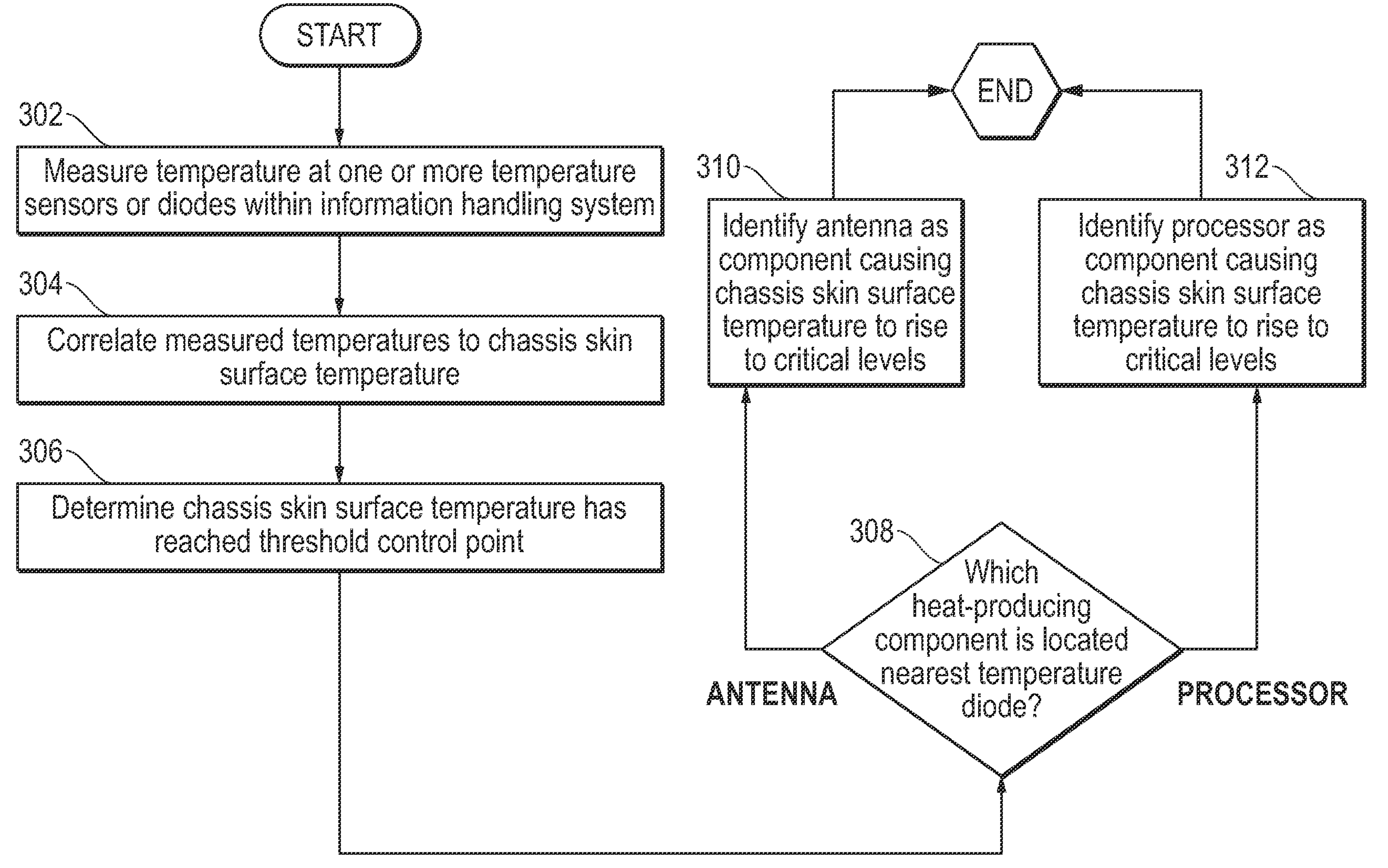
FIG. 3 is a flow diagram illustrating a method of identifying component driven increased skin surface temperature according to an embodiment of the present disclosure.

FIG. 3 is a flow diagram illustrating a method of identifying an information handling system component driving increased chassis skin surface temperature according to an embodiment of the present disclosure. As described herein, the containerized application and burst transmission thermal balance system in an embodiment may tailor a thermal control method for lowering skin surface temperature employed or mitigate heat generation by one or another of the heat generating components at a given time to address a specific source of heat energy causing an increase in the skin surface temperature of the chassis. FIG. 3 illustrates a method for determining which component of the information handling system is likely driving the increased temperature of the chassis skin surface.

At block 302, the containerized application and burst transmission thermal balance system in an embodiment may measure temperatures at one or more temperature sensors or diodes located inside the information handling system chassis. As described in various embodiments herein, a plurality of temperature sensors may be located throughout the information handling system. Further, the location of the temperature sensors at the chassis may correspond to one or more heat-producing component locations within the information handling system chassis. For example, in an embodiment described with reference to FIG. 2, various skin surface temperature sensors, including temperature diodes in some examples, may be situated at various points along the interior surface of the chassis portions (e.g., 281 or 282). As another example embodiment, one or more temperature sensor diodes may also be operably connected to the motherboard 290 and may be situated nearby the network interface device (e.g., 5G WWAN interface device), the CPU (e.g., 201), a Graphics Processing Unit (GPU), a Visual Processing Unit (VPU), or a hardware accelerator, or may be operably connected to a flywire extending to the interior surface of a chassis (e.g., 281 or 282) enclosing the information handling system 200 to allow such a temperature diode to measure a temperature at an interior portion of the chassis (e.g., 281 or 282). One or more of these temperature sensors or temperature diodes located along the motherboard in an embodiment may routinely take measurements of temperatures at the locations of those sensors or diodes.

In an embodiment, the containerized application and burst transmission thermal balance system may correlate measured temperatures at one or more temperature sensors or temperature diodes to a chassis skin surface temperature at one or more locations on the exterior chassis at block 304. In one example embodiment, a temperature measured at a temperature diode along the motherboard 290 may be used to infer, estimate, or correlate to a skin surface temperature at one or more portions of the chassis (e.g., 281 or 282), to a temperature of one or more antennas (e.g., **264*a* or 264*b*), or to a temperature of a processor (e.g., CPU 201, a GPU, a Visual Processing Unit (VPU), or a hardware accelerator). In such an embodiment, the containerized application and burst transmission thermal balance system may have access to a stored skin surface temperature correlation table developed during testing of the information handling system or a representative device that estimates the effect of varying temperatures measured at each of various temperature sensors or diodes located across the motherboard 290 on skin surface temperatures, antenna temperatures, or processor temperatures. Such a skin surface temperature correlation table may further include estimated temperatures for several different portions of the chassis for various temperatures at the temperature diode located at the motherboard 290 (e.g., situated nearby the antenna 264*a***).

In an embodiment in which such a skin surface temperature correlation table and array of temperature diodes situated across the motherboard 290 are employed, such a skin surface temperature correlation table may indicate that a 48 degree Celsius measurement at a diode 291 along motherboard 290 situated nearby processor 201 is correlated to a resulting 36 degree Celsius measurement at the left-hand palm rest in the chassis portion 281. In another example, the skin surface temperature correlation table may indicate that a 49 degree Celsius measurement at a diode 292 along motherboard 290 situated nearby antenna **264*b* is correlated to a resulting 37 degree Celsius measurement at the right-hand portion of the lower chassis 282**.

At block 306, the containerized application and burst transmission thermal balance system in an embodiment may determine the chassis skin surface temperature has reached a threshold control point, triggering potential for offloading or onloading of containerized applications to decrease temperature at one or more points along the exterior chassis. In both of the example embodiments described directly above at block 304, the containerized application and burst transmission thermal balance system may determine the estimated temperature at one or more portions of the chassis meets or exceeds a control point temperature of 35 degrees, for example. The control point value of 35 degrees in such an example embodiment may be set to any value below a maximum limit chassis skin surface temperature at which contact with the user's skin may become uncomfortable (e.g., 38 degrees Celsius). The control point value in various embodiments herein may be set slightly below this maximum limit chassis skin surface temperature in order to allow the containerized application and burst transmission thermal balance system to offload processing of containerized applications or shift offloaded processing tasks to local processors prior to the chassis skin reaching this maximum limit chassis skin surface temperature.

The containerized application and burst transmission thermal balance system in an embodiment may determine at block 308 which component is located nearest the temperature diode upon whose measurements the skin surface temperature meeting or exceeding the threshold control point have been estimated to approach within a threshold amount of a maximum chassis skin temperature limit. The containerized application and burst transmission thermal balance system in an embodiment may determine which component (e.g., processor 201 or antennas **264*a* or 264*b*) are driving the measured or estimated chassis skin temperature that meets or exceeds the control point value based on a stored association between the temperature diode (e.g., 291 or 292**) and a heat-producing component.

For example, the containerized application and burst transmission thermal balance system in an embodiment may access a stored identification of a nearest heat-producing component (e.g., antennas (e.g., **264*a* or 264*b*), or processor 201) to each of the temperature diodes (e.g., 291 or 292) located along the motherboard 290. More specifically, the containerized application and burst transmission thermal balance system in an embodiment may estimate that a portion of the chassis (e.g., left-hand portion of the palm rest) is expected to meet or exceed the control point temperature approaching the maximum chassis skin temperature limit, based on a temperature measured at a temperature diode 291 along the motherboard 290 situated nearest the CPU 201. In such an embodiment, the containerized application and burst transmission thermal balance system may identify the CPU 201 as the heat-producing component situated nearest the temperature diode 291, and determine the processor 201 is likely driving the temperature measured at the left-hand portion of the palm rest. As another example, the containerized application and burst transmission thermal balance system in an embodiment may estimate that a portion of the chassis (e.g., right-hand portion of the bottom chassis 282) is expected to meet or exceed the control point temperature approaching the maximum chassis skin temperature limit, based on a temperature measured at a temperature diode 292 along the motherboard 290 situated nearest the antenna 264***b*. In such an embodiment, the containerized application and burst transmission thermal balance system may identify the antenna 264*b* as the heat-producing component situated nearest the temperature diode 292, and determine the antenna 264*b* is likely driving the temperature measured at the right-hand portion of the bottom chassis 282.

If the antenna is located nearest the temperature diode upon whose measurements the skin surface temperature meeting or exceeding the threshold control point have been estimated, the method may proceed to block 310 for identification of the antenna as the causative agent of skin surface temperature reaching the control point value. If the processor is located nearest the temperature diode upon whose measurements the skin surface temperature meeting or exceeding the threshold control point have been estimated, the method may proceed to block 312 for identification of the processor as the causative agent of skin surface temperature reaching the control point value.

At block 310, the containerized application and burst transmission thermal balance system in an embodiment in which the antenna is located nearest the temperature diode may identify the antenna as the component causing the chassis skin surface temperature to rise to the control point value. By determining expected temperatures at a given location on the chassis skin surface based on measured temperatures at various temperature diodes along the motherboard and comparing those values using the skin surface temperature correlation chart described herein, the containerized application and burst transmission thermal balance system in an embodiment may identify which component is driving measured or estimated high temperatures at the given skin surface chassis location. The containerized application and burst transmission thermal balance system may thus identify the antenna as the causative agent, and the method may then end.

The containerized application and burst transmission thermal balance system in an embodiment in which the processor is located nearest the temperature diode may identify the processor as the component causing the chassis skin surface temperature to rise to the control point value at block 312. The containerized application and burst transmission thermal balance system may thus identify the processor as the causative agent, and the method may then end.

Figure 4:
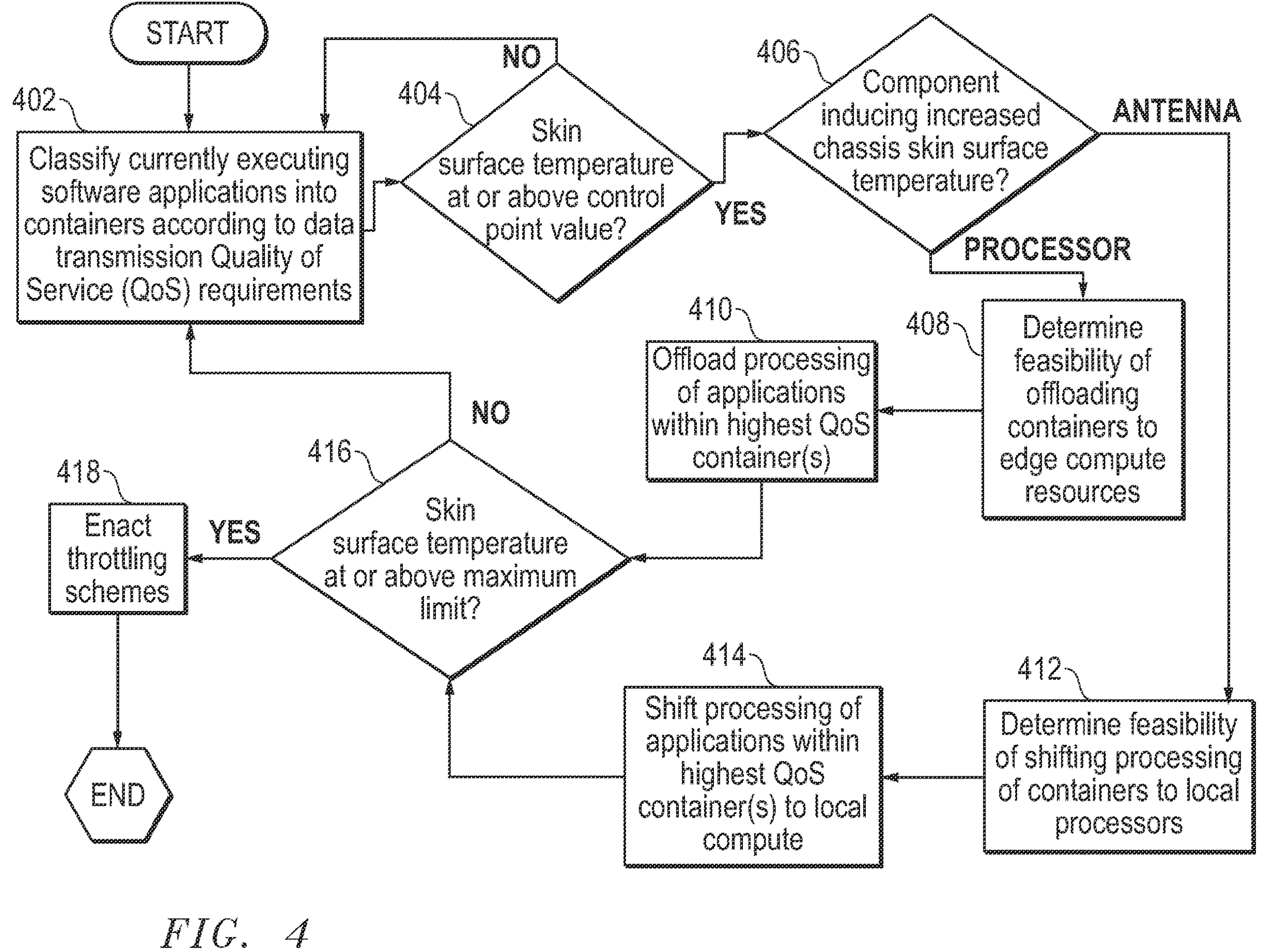
FIG. 4 is a flow diagram illustrating a method of tailoring processing and a thermal control method based on an identified source of increased skin surface temperature according to an embodiment of the present disclosure.

FIG. 4 is a flow diagram illustrating a method of tailoring a thermal control method to manage skin surface temperature from reaching a maximum limit chassis skin surface temperature based on an identified causal source of increased skin surface temperature to maintain containerized software application performance for high priority containers according to an embodiment of the present disclosure. As described herein, there is a need to balance between offloading processing tasks to decrease processor temperature and increasing burst transmissions or high data rate or high bandwidth continuous transmissions to edge computing resources in support of this offloading, or vice versa, depending on which components (e.g., processors or antennas) are currently driving increased temperatures of the chassis skin surface. FIG. 4 illustrates a method of tailoring a response to increased chassis skin surface temperatures that approach the maximum limit chassis skin surface temperature (e.g., maximum temperature comfortable for a user's skin) to a control point temperature threshold based on an identification of the component likely driving those increased temperatures.

At block 402, a load balancing driver in an embodiment may classify currently executing software applications into containers according to data transmission Quality of Service (QoS) requirements for each application. For example, as described in an embodiment with reference to FIG. 1, the load balancing driver 123 in an embodiment may operate to balance the transceiving of data packets pursuant to execution of software applications by the OS 120 across a plurality of network interface devices (e.g., 160). The load balancing driver 123 in an embodiment may group various software applications executing via the OS 120, pursuant to which data is being transceived via the network interface device 160 into a plurality of containers, according to the Quality of Service (QoS) requirements for each application. QoS requirements in an embodiment may be set within the code instructions of applications, or may be adjustable by a user. For example, certain latency-sensitive applications, such as videoconferencing applications like Zoom® or Microsoft® Teams® may be grouped together into a high QoS container, because those applications often require lower latency, and thus higher QoS wireless links in order to perform optimally. Similarly, gaming applications that involve heavily operating on a GPU may be grouped in a high QoS container since such gaming may include remote gaming portions requiring high latency. In another example, software applications that have offloaded some or all processing tasks to remote edge computing resources within network 170 may also be grouped into such a high QoS container, because such offloading requires rapid and frequent transceiving of data in order to perform remote processing tasks. In yet another example, software applications less sensitive to latency or requiring lower throughput values in order to operate effectively, such as Google® Chrome® may be grouped into lower QoS containers.

At block 404, the containerized application and burst transmission thermal balance system in an embodiment may determine whether any portion of the chassis skin surface meets or exceeds a control point value. As described herein, the control point value in various embodiments herein may be set slightly below a maximum limit chassis skin surface temperature at which contact with the user's skin may become uncomfortable (e.g., 38 degrees Celsius). For example, the control point value in an example embodiment may be set to a value of 35 degrees, or three degrees below this maximum limit chassis skin surface temperature in order to allow the containerized application and burst transmission thermal balance system to offload processing of containerized applications or shift offloaded processing tasks to local processors prior to the chassis skin reaching this maximum limit chassis skin surface temperature. If the skin surface temperature has not reached the control point value, there may not yet be a need to shift the burden of processing associated with software application containers, and the method may proceed back to block 402 for period or routing re-classification of software applications into containers, as new applications are initiated. If the skin surface temperature has reached the control point value, shifting the burden of processing associated with software application containers may be considered as a method of maintaining a skin surface temperature below the maximum limit chassis skin surface temperature. The method may then proceed to block 406 for identification of the component that is causing the increase in skin surface temperature.

The containerized application and burst transmission thermal balance system in an embodiment at block 406 may determine which component is driving a chassis skin surface temperature reaching a control point value. As described above with reference to FIG. 3, by estimating a skin surface temperature based on a measured temperature at a motherboard mounted temperature diode and identifying the heat-producing component at a location situated nearest that diode, the containerized application and burst transmission thermal balance system in an embodiment may identify which component is driving measured high temperatures at the given skin surface chassis location. If it is determined that the processor is driving the increased skin surface temperature, the method may proceed to block 408 to tailor a method for controlling the skin surface temperature to specifically address the increased temperature of the processor. In some embodiments, the processor may be one of or a combination of a CPU, a GPU, a Visual Processing Unit (VPU), or a hardware accelerator, and a thermal sensor may be located on the motherboard for both or located on a separate graphics card for a GPU, a Visual Processing Unit (VPU), or a hardware accelerator where applicable in various embodiments. If it is determined that the antenna or a radio is driving the increased skin surface temperature, the method may proceed to block 412 to tailor a method for controlling the skin surface temperature to specifically address the increased temperature of the antenna. The thermal sensor for the antenna or radio may be located in some embodiments on another portion of a motherboard or may be located on a separate card for a network interface device where applicable in various embodiments.

At block 408, in an embodiment in which the processor is driving the increased temperature of the skin surface, the containerized application and burst transmission thermal balance system may determine feasibility of offloading one or more containers to an edge compute resource. As part of this determination, the containerized application and burst transmission thermal balance system in an embodiment may determine a percentage of processing resources that are being consumed by high QoS container(s). Once the containerized application and burst transmission thermal balance system in an embodiment has identified the component most likely to be causing the increased temperatures at the chassis skin surface, it may estimate whether offloading processing tasks associated with the highest QoS container applications currently being executed by the local processor may bring the chassis skin surface temperature back below the control point value or estimate a stabilized temperature under a maximum limit chassis skin surface temperature. In order to make such a determination in an embodiment in which the processor is the causative component, the containerized application and burst transmission thermal balance system may first determine the burden placed on the processor due to local processing of software applications that could be executed remotely, at edge compute resources. As described herein, these various software applications may be placed within certain containers based on QoS requirements associated therewith. There may be a plurality of these containers in some embodiments. For example, the information handling system may be executing software applications falling into a high QoS container, a medium QoS container, and a low QoS container.

The containerized application and burst transmission thermal balance system may also determine the percentage of local processing resources that are being consumed during execution of the highest QoS container currently executing on a local processor, rather than an edge computing resource. For example, if all software applications are currently executing locally, the containerized application and burst transmission thermal balance system in such an embodiment may determine the percentage of processing resources being consumed by the local processor during execution of the high QoS container. In such an example embodiment described with reference to FIG. 1, the containerized application and burst transmission thermal balance system 140 may determine that 30% of the processing resources are currently being consumed by software applications labeled by the load balancing driver 123 as falling within the high QoS container. In another example, if the high QoS container is currently being offloaded to an edge computing resource, the next highest QoS container currently executing at the local processor may be the medium QoS container. In such an example embodiment, the containerized application and burst transmission thermal balance system 140 may determine that 2% of the processing resources are currently being consumed by software applications labeled by the load balancing driver 123 as falling within the medium QoS container.

The containerized application and burst transmission thermal balance system in an embodiment may estimate a reduced skin surface temperature resulting from offloading of processing tasks for the highest QoS container currently executing at a local processor to edge computing resources. In an embodiment in which the containerized application and burst transmission thermal balance system determines that 30% of the processing resources are consumed by high QoS applications currently being executed at the local processor, for example, offloading these processing tasks to a remote edge compute resource may be estimated to result in a particular decrease in power supplied to the processor. For example, an estimated 30% decrease in power may also result in offloading processing tasks to edge compute resources via the high data bandwidth radio and antenna. In another example embodiment, the containerized application and burst transmission thermal balance system may determine that a 2% decrease in processing resource consumption resulting from offloading of medium QoS container applications (e.g., the highest QoS container executing locally where the high QoS container has already been offloaded) may result in a smaller decrease, for example a 2% decrease, in the power needing to be supplied to the processor. It is contemplated that the correlation of percentage of processing resource consumption may not correspond one to one to a percentage decrease in power needing to be supplied to the processor in all embodiments. Any correlation between percentage of processing resource consumption and a percentage decrease in power needing to be supplied to the processor may apply in various embodiments herein and the above in an example.

The containerized application and burst transmission thermal balance system in an embodiment may have access to a stored power/temperature correlation table that correlates known changes in power to various components of the information handling system to changes in temperature estimated to occur at one or more temperature diodes located along the motherboard. These correlations may be made during manufacture, testing, or configuration of the information handling system or of a representative device for the information handling system having the same configuration of internal components. Further, these correlations may be made based on measured laboratory values, or upon estimates made using various measurements of temperature, temperature resistance of various materials (e.g., as used within the chassis, motherboard, CPU, GPU, a Visual Processing Unit (VPU), or a hardware accelerator network interface device, or antennas), or power to those various components. The containerized application and burst transmission thermal balance system in an embodiment may, by referencing these correlation tables, estimate an updated skin surface temperature that may result from a decrease in power supplied to the processor.

For example, the containerized application and burst transmission thermal balance system may estimate a 30% reduction in power supplied to the processor as a result of offloading processing of high QoS container applications will result in a four degree Celsius decrease in temperature at the temperature diode situated nearest the processor. More specifically, the skin surface temperature in the left-hand side of the palm rest in an embodiment may be estimated at 36 degrees Celsius, based on a measured temperature of 48 degrees Celsius at a diode on the motherboard situated nearest the processor. A four degree Celsius decrease in temperature at that diode, estimated to occur pursuant to a 30% drop in power supplied to the processor following offloading of high QoS container applications may result in an estimated temperature of 44 degrees Celsius at the diode located nearest the processor. The containerized application and burst transmission thermal balance system in such an embodiment may refer back to the skin surface temperature correlation table described above with respect to FIG. 3 to determine that a 44 degree Celsius measurement at the diode located nearest the processor is correlated to a skin surface temperature of 34 degrees Celsius, which is below the control point value of 35 degrees Celsius and below a maximum limit chassis skin surface temperature which may be set at 38 degrees Celsius.

As another example, the containerized application and burst transmission thermal balance system may estimate a 2% reduction in power supplied to the processor as a result of offloading processing of medium QoS container applications will result in a 0.5 degree Celsius decrease in temperature at the temperature diode situated nearest the processor. More specifically, the skin surface temperature in the left-hand side of the palm rest in an embodiment may be estimated at 36 degrees Celsius, based on a measured temperature of 48 degrees Celsius at a diode on the motherboard situated nearest the processor. A 0.5 degree Celsius decrease in temperature at that diode, estimated to occur pursuant to a 2% drop in power supplied to the processor following offloading of medium QoS container applications may result in an estimated temperature of 47.5 degrees Celsius at the diode located nearest the processor. The containerized application and burst transmission thermal balance system in such an embodiment may refer back to the skin surface temperature correlation table described above with respect to FIG. 3 to determine that a 47.5 degree Celsius measurement at the diode located nearest the processor is correlated to a skin surface temperature of 36.5 degrees Celsius, which is above the control point value of 35 degrees Celsius, but may still be below a maximum limit chassis skin surface temperature such as 38 degrees Celsius.

The containerized application and burst transmission thermal balance system in an embodiment may determine whether the estimated reduced skin temperature is below the control point value. For example, the containerized application and burst transmission thermal balance system in an embodiment may estimate that offloading to remote edge computing resources the high QoS container software applications currently consuming 30% of processing resources at the local processor found to drive increased chassis skin surface temperatures in an embodiment will likely decrease the heat generated to increase those skin surface temperatures to an estimated 34 degrees Celsius, which is below the control point value of 35 degrees Celsius. In another example, the containerized application and burst transmission thermal balance system in an embodiment may estimate that offloading to remote edge computing resources the medium QoS container software applications currently consuming 2% of processing resources at the local processor found to drive increased chassis skin surface temperatures in an embodiment will likely decrease heat generated to increase those skin surface temperatures to maintain approximately 37.5 degrees Celsius, which is still exceeds the control point value of 35 degrees Celsius, but does not exceed a maximum limit chassis skin surface temperature which may be set at 38 degrees Celsius. If, however, projection is that the maximum limit chassis skin surface temperature may be exceeded, additional shifting of processing, if available, may be conducted in some embodiments.

At block 410 in an embodiment, the containerized application and burst transmission thermal balance system may instruct to offload processing tasks for the highest QoS containers currently executing locally to edge computing resources via a radio and antenna system with high data bandwidth capabilities. This offloading of processing tasks to the radio and antenna system may occur when a processor is determined to be a causal heat component of the skin temperature reaching a control point approaching at a threshold percentage or threshold amount before a maximum limit chassis skin surface temperature is reached. For example, in an embodiment the containerized application and burst transmission thermal balance system may determine feasibility for offloading the high QoS container software applications currently consuming 30% of processing resources at the local processor. In such an embodiment, for example, as described with reference to FIG. 1, the containerized application and burst transmission thermal balance system 140 may instruct a load balancing driver 123 to offload processing tasks related to software applications falling within the high QoS container 191 to edge computing resources 190 located in the network 170. The containerized application and burst transmission thermal balance system 140 in such an embodiment may further instruct the power management unit 104 to decrease the power supplied to processor 101 by 30%, causing the temperature of the processor and the portion of the chassis skin surface including the left-hand palm rest to decrease. In such a way, the containerized application and burst transmission thermal balance system in an embodiment may control the chassis skin surface temperature to remain under a maximum limit chassis skin surface temperature for as long as feasible while ensuring the containerized applications so offloaded continue to perform at a high level. The method may then proceed to block 416 to determine whether the offloading of containerized applications performed at block 410 successfully maintained the skin surface temperature at or below the maximum limit chassis skin surface temperature, avoiding a need to enact traditional throttling schemes likely to degrade performance of those containerized applications.

At block 412, in an embodiment in which the antenna is driving the increased temperature of the skin surface, the containerized application and burst transmission thermal balance system may determine a percentage of packets being transceived by the antenna pursuant to execution of applications in the highest QoS container(s) currently offloaded to edge computing resources. Once the containerized application and burst transmission thermal balance system in an embodiment has identified the antenna as the component most likely to be causing the increased temperatures at the chassis skin surface, it may estimate whether executing these applications locally, thus decreasing transmissions made pursuant to execution of those applications may bring the chassis skin surface temperature back below the control point value. In order to make such a determination in an embodiment in which an antenna is the causative component, the containerized application and burst transmission thermal balance system may first determine the power supplied to the antenna to support offloaded processing during execution of software applications that could be executed locally.

As described in an embodiment with reference to FIG. 1, the load balancing driver 123 may track bandwidth of all software applications executing under the OS 120, pursuant to which data is transferred via a wireless link to the network 170. In such a way, the load balancing driver 123 may provide information the containerized application and burst transmission thermal balance system 140 may use to determine what percentage of packets being transceived via one or more network interface devices (e.g., 160) are attributable to execution of each software application executing at the OS 120. Thus, the containerized application and burst transmission thermal balance system 140 in an embodiment may determine through communication with the load balancing driver 123 that 30% of the processing packets currently being transceived via antenna 166 are being transceived pursuant to execution of software applications labeled by the load balancing driver 123 as falling within the high QoS container 191, which may be the highest QoS container currently offloaded for execution at an edge compute resource 190. In another example, the containerized application and burst transmission thermal balance system 140 may determine that 2% of the processing packets currently being transceived via antenna 166 are being transceived pursuant to execution of software applications labeled by the load balancing driver 123 as falling within the medium QoS container 191, which may be the next highest QoS container currently offloaded for execution at an edge compute resource 190 (e.g., in an embodiment in which a high QoS container is currently being executed locally).

The containerized application and burst transmission thermal balance system in an embodiment may determine feasibility of shifting processing tasks for one or more containerized applications currently being offloaded to edge compute resources to local processors at block 412. As part of this determination, the containerized application and burst transmission thermal balance system in an embodiment may estimate a reduced heat generated by the antenna to stabilize the temperature resulting from shifting of processing for the highest QoS container currently offloaded to edge computing resources back to local processors. In an embodiment in which the containerized application and burst transmission thermal balance system determines that 30% of the packets being transceived are being transceived due to offloaded processing for high QoS applications, for example, executing these processing tasks locally (e.g., at processor 101), and cessation of packet transmission in support of remote processing may be estimated to result in a 30% decrease in power supplied to the antenna. In another example embodiment, the containerized application and burst transmission thermal balance system may determine that a 2% decrease in packet transmission in support of offloaded processing of medium QoS container applications may result in only a 2% decrease in the power supplied to the antenna. Again, it is contemplated that the correlation of percentage of processing resource consumption may not correspond one to one to a percentage decrease in power needing to be supplied to the processor in all embodiments. Any correlation between percentage of processing resource consumption and a percentage decrease in power needing to be supplied to the processor may apply in various embodiments herein.

The containerized application and burst transmission thermal balance system in an embodiment may access the stored power/temperature correlation table to estimate an updated skin surface temperature that may result from a decrease in power supplied to the antenna. For example, the containerized application and burst transmission thermal balance system may estimate a 30% reduction in power supplied to the antenna as a result of shifting processing of currently offloaded high QoS container applications to a local processor will result in a four degree Celsius decrease in temperature at the temperature diode situated nearest the antenna. More specifically, the skin surface temperature in the right-hand side of the bottom chassis in an embodiment may be estimated at 37 degrees Celsius, based on a measured temperature of 49 degrees Celsius at a diode on the motherboard situated nearest the antenna. A four degree Celsius decrease in temperature at that diode, estimated to occur pursuant to a 30% drop in power supplied to the processor following shifting execution of high QoS container applications to local processors may result in an estimated temperature of 45 degrees Celsius at the diode located nearest the antenna. The containerized application and burst transmission thermal balance system in such an embodiment may refer back to the skin surface temperature correlation table described above with respect to FIG. 3 to determine that a 45 degree Celsius measurement at the diode located nearest the processor is correlated to a skin surface temperature of 33 degrees Celsius, which is below the control point value of 35 degrees Celsius as well as below the maximum limit chassis skin surface temperature which may be set at 38 degrees Celsius in an example embodiment.

As another example, the containerized application and burst transmission thermal balance system may estimate a 2% reduction in power supplied to the processor as a result of shifting processing of currently offloaded medium QoS container applications to local processors will result in a one degree Celsius decrease in temperature at the temperature diode situated nearest the antenna. More specifically, the skin surface temperature in the right-hand side of the bottom chassis in an embodiment may be estimated at 37 degrees Celsius, based on a measured temperature of 49 degrees Celsius at a diode on the motherboard situated nearest the processor. A one degree Celsius decrease in temperature at that diode, estimated to occur pursuant to a 2% drop in power supplied to the antenna following shifting of currently offloaded medium QoS container applications to local processors may result in an estimated temperature of 48 degrees Celsius at the diode located nearest the processor. The containerized application and burst transmission thermal balance system in such an embodiment may refer back to the skin surface temperature correlation table described above with respect to FIG. 3 to determine that a 48 degree Celsius measurement at the diode located nearest the antenna is correlated to a skin surface temperature of 36 degrees Celsius, which is above the control point value of 35 degrees Celsius, but still below the maximum limit chassis skin surface temperature if set at 38 degrees Celsius in the example embodiment.

The containerized application and burst transmission thermal balance system in an embodiment may determine whether the estimated effect of the reduced antenna temperature will reduce the estimated skin temperature below the control point value. For example, the containerized application and burst transmission thermal balance system in an embodiment may estimate that executing the high QoS container software applications via a local processor may decrease the volume of packets being transceived by the antenna 264*b* by 30%, decreasing the temperature at the skin to an estimated 33 degrees Celsius. This may be below a control point value of 35 degrees Celsius. In another example, the containerized application and burst transmission thermal balance system in an embodiment may estimate that executing the medium QoS container software applications via a local processor may decrease the volume of packets being transceived by the antenna 264*b* by 2%, decreasing the temperature at the skin to an estimated 37 degrees Celsius, which remains above the control point value of 35 degrees Celsius. In some embodiments, the projected stable skin surface temperature may exceed the maximum limit chassis skin surface temperature in which case the containerized application and burst transmission thermal balance system may determine the next-highest QoS container software applications that may need to have processing shifted to local processing according to embodiments herein.

At block 414 in an embodiment, the containerized application and burst transmission thermal balance system may instruct the information handling system, such as with a load balancing driver executing thereon, to shift processing tasks for high QoS containers to local processors. This shifting of processing tasks to local processor may occur when a high data bandwidth antenna or radio utilizing a wireless link with edge computing resources is determined to be a causal heat component of the skin temperature reaching a control point approaching a level that is a threshold percentage or at a threshold amount before reaching a maximum limit chassis skin surface temperature. For example, in an embodiment the containerized application and burst transmission thermal balance system may determine that 30% of all data packets for processing are being transceived via the antenna driving high skin surface temperatures pursuant to execution of a currently offloaded high QoS container. In such an embodiment, for example, as described with reference to FIG. 1, the containerized application and burst transmission thermal balance system 140 may instruct the load balancing driver 123 to stop offloading these processing tasks related to software applications falling within the high QoS container currently executed at the edge computing resources 190 located in the network 170, and to instruct the processor 101 to locally execute those high QoS container applications. The containerized application and burst transmission thermal balance system 140 in such an embodiment may further instruct the power management unit 104 to decrease the power supplied to antenna 166 by a fixed amount, for example 30%, causing the temperature of the antenna 166 to generate less heat and the portion of the chassis skin surface including the right-hand side of the bottom chassis to stabilize or even decrease. In such a way, the containerized application and burst transmission thermal balance system in an embodiment may control the chassis skin surface temperature to remain under a maximum limit chassis skin surface temperature for as long as feasible while simultaneously ensuring the containerized applications now consuming local processing resources continue to perform at a high level. The method may then proceed to block 416 to determine whether the shifting of previously offloaded containerized applications to local compute resources performed at block 414 successfully maintained the skin surface temperature at or below the maximum limit chassis skin surface temperature, avoiding a need to enact traditional throttling schemes likely to degrade performance of those containerized applications.

In an embodiment in which the containerized application and burst transmission thermal balance system has either offloaded processing of containerized applications or shifted processing of currently offloaded containerized applications to local computing resources in an attempt to lower skin surface temperatures, the containerized application and burst transmission thermal balance system may determine at block 416 whether such an attempt has successfully maintained the skin surface temperature at or below a maximum limit chassis skin surface temperature. As described herein, the maximum limit chassis skin surface temperature may correlate to a maximum temperature at which a user's skin may comfortably come into contact with the chassis skin surface. Once the chassis skin surface reaches such a maximum limit chassis skin surface temperature, the need to decrease the chassis skin surface temperature may outweigh the need to maintain optimal performance of containerized software applications. If the skin surface temperature has not yet reached the maximum limit chassis skin surface temperature, the method may proceed back to block 402 to reclassify all currently executing software applications into appropriate containers based on QoS requirements and depending upon where they are currently being executed, for example locally or at edge computing resources. By repeating the loop between blocks 402 and 416, the containerized application and burst transmission thermal balance system may continuously monitor and orchestrate offloading or onloading of various containers as a method of maintaining a skin surface temperature below the maximum limit chassis skin surface temperature while also ensuring optimal performance of those containerized applications. If the skin surface temperature has reached the maximum limit chassis skin surface temperature, more drastic measures may be needed to decrease the chassis skin surface temperature, and the method may proceed to block 418 for enactment of traditional throttling schemes.

At block 418, in an embodiment in which the containerized application and burst transmission thermal balance system determines either an attempt to offload processing tasks to address high processor temperatures or an attempt to shift execution of processing tasks to a local processor to address high antenna temperatures has failed to maintain a chassis skin surface temperature below the maximum limit chassis skin surface temperature, the containerized application and burst transmission thermal balance system may initiate traditional power throttling schemes. For example, the containerized application and burst transmission thermal balance system in an embodiment may throttle power supplied to the local processor, resulting in decreased performance of applications currently executed by the local processor. As another example, in an embodiment, the containerized application and burst transmission thermal balance system may throttle power supplied to the antenna, resulting in decreased performance of applications currently being offloaded to edge computing resources. In still another embodiment, the containerized application and burst transmission thermal balance system may engage other thermal control mechanisms, such as fans or cooling strips. The method may then end.

The blocks of the flow diagrams of FIGS. 3-4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing a containerized application and burst transmission thermal balance system comprising:

a hardware processor executing machine readable code instructions of a first containerized portion of a containerized software application on the information handling system;

a network interface device with an antenna and radio configured to transceive data packets via a wireless link meeting a preset quality of service (QOS) requirement to an edge computing resource for offloading computing from the processor to execute a second containerized portion of the containerized software application for presentation on the information handling system depending on a chassis skin surface temperature;

a first temperature sensor of a plurality of temperature sensors in the information handling system chassis to measure a processor-associated chassis skin surface temperature at a first location of an outer chassis surface of the information handling system chassis associated with a hardware processor location within the information handling system chassis;

the hardware processor executing machine readable code instructions of the containerized application and burst transmission thermal balance system to determine the processor-associated chassis skin surface temperature of the first location of the outer surface of the information handling system chassis is approaching a maximum limit chassis skin surface temperature;

the hardware processor executing machine readable code instructions of the containerized application and burst transmission thermal balance system to instruct a load balancing driver to offload the execution of the second containerized portion of the containerized software application to the edge computing resource via the antenna when the processor-associated chassis skin surface temperature of the first location of the outer surface of the information handling system chassis approaches the maximum limit chassis skin surface temperature; and the processor executing machine readable code instructions of the containerized application and burst transmission thermal balance system to instruct the load balancing driver to direct keeping the execution of the second containerized portion of the containerized software application to the hardware processor onboard the information handling system when an antenna-associated chassis skin surface temperature measured at a second location of the outer surface of the information handling system chassis approaches the maximum limit chassis skin surface temperature from a second temperature sensor associated with an antenna location within the information handling system chassis to limit a further increase in the antenna-associated chassis skin surface temperature at the second location.

2. The information handling system of claim 1, wherein the first temperature sensor is a thermal diode operably connected to a motherboard and the first location on the outer surface of the information handling system chassis is co-located with the hardware processor location within the information handling system chassis to measure the processor-associated chassis skin surface temperature.

3. The information handling system of claim 1, wherein the second temperature sensor is a thermal diode operably connected to the network interface device and the second location on the outer surface of the information handling system chassis is co-located with the antenna location within the information handling system chassis to measure the antenna-associated chassis skin surface temperature.

4. The information handling system of claim 1, wherein the hardware processor is a graphics processing unit (GPU), and the containerized software application is a gaming software application.

5. The information handling system of claim 1, wherein the first temperature sensor is a thermal diode operably connected to the first location on an inner surface of an outer wall of the information handling system chassis that is proximate to the hardware processor to measure the processor-associated chassis skin surface temperature, and the hardware processor is a graphics processing unit (GPU).

6. The information handling system of claim 1 further comprising:

a power management unit decreasing power supplied to the hardware processor to lower the operating temperature of the hardware processor and the processor-associated chassis skin surface temperature of the outer surface of the information handling system chassis at the first location approaching the maximum limit chassis skin surface temperature.

7. The information handling system of claim 1 further comprising:

the hardware processor machine readable executing code instructions to initiate throttling of power delivery to the antenna transceiving data packets via the wireless link with the edge computing processing resource when the second temperature sensor associated with the antenna indicates the antenna-associated chassis skin surface temperature of the second location of the outer surface of the information handling system chassis approaches the maximum limit chassis skin surface temperature.

8. The information handling system of claim 1 further comprising:

the plurality of temperature sensors measuring internal temperatures for a plurality of information handling system components internal to the information handling system chassis, including the hardware processor and the antenna, to determine the processor-associated chassis skin surface temperature and antenna-associated chassis skin surface temperature of plural locations of the outer surface of the information handling system chassis; and the containerized application and burst transmission thermal balance system referencing a correlation table associating the measured current temperatures internal to the information handling system chassis and associated with the plural locations at the outer surface of the information handling system chassis of each of the plurality of information handling system components with an estimated processor-associated chassis skin surface temperature and an estimated antenna-associated chassis skin surface temperature to determine which of the plurality of information handling system components is the causal heat source causing the processor-associated chassis skin surface temperature or the antenna-associated chassis skin surface temperature of the outer surface of the information handling system chassis to approach the maximum limit chassis skin surface temperature.

9. An information handling system executing a containerized application and burst transmission thermal balance system comprising:

a hardware processor executing machine readable code instructions of a first containerized portion of a containerized software application on the information handling system;

a network interface device with an antenna and radio configured to transceive data packets via a wireless link meeting a preset quality of service (QOS) requirement to an edge computing resource to execute a second containerized portion of the containerized software application for presentation on the information handling system to offload computing from the processor depending on a processor-associated chassis skin surface temperature and an antenna-associated chassis skin surface temperature;

a first temperature sensor of a plurality of temperature sensors in the information handling system chassis to determine the processor-associated chassis skin surface temperature at a first location of an outer surface of the information handling system chassis associated with the hardware processor;

a second temperature sensor of the plurality of temperature sensors in the information handling system chassis to determine the antenna-associated chassis skin surface temperature at a second location of an outer surface of the information handling system chassis associated with the antenna or the radio;

the embedded controller executing code instructions of the containerized application and burst transmission thermal balance system to instruct a load balancing driver to offload the execution of the second containerized portion of the containerized software application to the edge computing resource via the antenna when the processor-associated chassis skin surface temperature measured at the first temperature sensor at the first location of the outer surface of the information handling system chassis associated with the hardware processor reaches a control point limit chassis skin surface temperature; and the embedded controller executing code instructions of the containerized application and burst transmission thermal balance system to instruct the load balancing driver to direct keeping the execution of the second containerized portion of the containerized software application to the processor onboard the information handling system from the edge computing resource when the antenna-associated chassis skin surface temperature measured at the second temperature sensor at the second location of the outer surface of the information handling system chassis associated with the antenna and radio reaches the control point limit chassis skin surface temperature.

10. The information handling system of claim 9, wherein the first temperature sensor is a thermal diode operably connected to a motherboard and the first location is on the outer surface of the information handling system chassis co-located with the hardware processor within the information handling system chassis.

11. The information handling system of claim 9, wherein the second temperature sensor is a thermal diode operably connected to the network interface device and the second location on the outer surface of the information handling system chassis co-located with the radio or the antenna within the information handling system chassis.

12. The information handling system of claim 9, wherein the hardware processor is a visual processing unit (VPU).

13. The information handling system of claim 9, wherein the plurality of temperature sensors include at least the first temperature sensor that is a thermal diode operably connected to a motherboard and is proximate to the hardware processor and the second temperature sensor that is a second thermal diode operably connected to the network interface device and is proximate to the radio or the antenna.

14. The information handling system of claim 9 further comprising:

the embedded controller executing code instructions to initiate throttling of power delivery to the antenna transceiving data packets via the wireless link with the edge computing processing resource in support of execution of the second containerized portion of the containerized software application after the antenna-associated chassis skin temperature meets the control point limit chassis skin surface temperature at the second location as measured by the second temperature sensor associated with the antenna or the radio.

15. The information handling system of claim 9 further comprising:

the embedded controller executing code instructions to initiate throttling of power delivery to the hardware processor executing the first containerized portion of the containerized software application after the processor-associated chassis skin temperature meets the control point limit chassis skin surface temperature at the first location as measured by the first temperature sensor associated with the hardware processor.

16. A method of balancing execution of containerized software applications and burst transmission thermal increases in an information handling system comprising:

executing a first containerized portion of containerized software application, via a hardware processor on the information handling system;

transceiving data packets via a wireless link of a network interface device with an antenna and a radio meeting a preset quality of service (QOS) requirement to an edge computing resource for offloading computing from the hardware processor to execute a second containerized portion of the containerized software application for presentation on the information handling system depending on a processor-associated chassis skin surface temperature and an antenna-associated chassis skin surface temperature;

determining, via an embedded controller, that the processor-associated chassis skin surface temperature of an outer surface of the information handling system chassis at a first chassis location meets a control point limit chassis skin surface temperature based on a first temperature measured at the first chassis location by a first temperature sensor of a plurality of temperature sensors in the information handling system chassis, where the first temperature sensor is associated with a hardware processor location within the information handling system chassis;

offloading the execution of part of the second containerized portion of the containerized software application, via the network interface device, to the edge computing resource via the antenna, when the hardware processor is determined as a causal heat source for the processor-associated chassis skin surface temperature meeting the control point at the first chassis location; and determining when a second chassis location on the outer surface of the information handling system chassis causes the antenna-associated chassis skin surface temperature to meet the control point at the second chassis location from a second temperature measurement at a second temperature sensor associated with an antenna or radio location within the information handling system and shifting the execution of the second containerized portion of the containerized software application back onboard to the hardware processor on the information handling system.

17. The method of claim 16, wherein the first temperature sensor is a thermal diode and the first chassis location is within an outer wall of the information handling system chassis co-located with the hardware processor location within the information handling system chassis.

18. The method of claim 16, wherein the second temperature sensor is a thermal diode and the second chassis location is within an outer wall of the information handling system chassis co-located with the antenna or radio location within the information handling system chassis.

19. The method of claim 16 further comprising:

decreasing power supplied to the hardware processor via a power management unit to lower the operating temperature of the hardware processor when the processor-associated chassis skin temperature at the first chassis location of the outer surface of the information handling system chassis meets the control point approaching the maximum limit chassis skin surface temperature; and decreasing power supplied to the antenna or the radio via a power management unit to lower the operating temperature of the antenna or the radio when the antenn-associated chassis skin temperature at the second chassis location of the outer surface of the information handling system chassis meets the control point approaching the maximum limit chassis skin surface temperature.

20. The method of claim 16 further comprising:

throttling power supplied to a causal heat source selected from the hardware processor or the antenna and radio determined from the first chassis location or the second chassis location when the processor-associated chassis skin surface temperature of the antenna-associated chassis skin surface temperature of the first chassis location or the second chassis location, respectively of the information handling system chassis meets the maximum limit chassis skin surface temperature.

* * * * *